US008918823B2

(12) United States Patent
Fraleu et al.

(10) Patent No.: US 8,918,823 B2
(45) Date of Patent: Dec. 23, 2014

(54) DIGITAL DECODER HAVING A SO-CALLED "PLAYBACK" MODE OF OPERATION AND COMPRISING TWO BUFFER MEMORIES

(75) Inventors: Sébastien Fraleu, Noyal sur Vilaine (FR); André Magras, Saint Grégoire (FR); Thierry Quere, Montfort sur Meu (FR)

(73) Assignee: Thomson Licensing, Issy les Moulineaux (FR)

( * ) Notice: Subject to any disclaimer, the term of this patent is extended or adjusted under 35 U.S.C. 154(b) by 2777 days.

(21) Appl. No.: 10/437,704

(22) Filed: May 14, 2003

(65) Prior Publication Data

US 2003/0219222 A1    Nov. 27, 2003

(30) Foreign Application Priority Data

May 16, 2002    (FR) ...................................... 02 06012

(51) Int. Cl.
| | | |
|---|---|---|
| *H04N 7/173* | (2011.01) | |
| *H04N 5/44* | (2011.01) | |
| *H04N 5/76* | (2006.01) | |

(52) U.S. Cl.
CPC ............... *H04N 5/4401* (2013.01); *H04N 5/76* (2013.01)
USPC ............. 725/94; 725/89; 375/240.25; 386/46

(58) Field of Classification Search
USPC ............................ 725/94; 375/240.25; 386/46
See application file for complete search history.

(56) References Cited

U.S. PATENT DOCUMENTS

| | | | |
|---|---|---|---|
| 5,371,551 A | | 12/1994 | Logan et al. |
| 5,438,423 A | * | 8/1995 | Lynch et al. .................. 386/109 |

(Continued)

FOREIGN PATENT DOCUMENTS

| | | |
|---|---|---|
| EP | 0 711 072 A2 | 5/1995 |
| EP | 0 793 355 A2 | 9/1997 |

(Continued)

OTHER PUBLICATIONS

European Search Report dated Aug. 4, 2003 of European Patent Application No. 03101368.3-2202.

*Primary Examiner* — Pankaj Kumar
*Assistant Examiner* — Charles N Hicks
(74) *Attorney, Agent, or Firm* — Vincent E. Duffy; Joel M. Fogelson

(57) ABSTRACT

A digital decoder for television receiver, comprises an input (E) for receiving a digital audio/video signal (SAV), means for demodulating and decoding the input signal into an output signal intended for the television receiver, and a first buffer memory (8) into which the input signal is diverted after demodulation (SO) when the decoder is placed in a so-called "live" mode of operation. In a so-called "replay" mode of operation, the signal recorded in the first buffer memory constitutes the output signal. This decoder comprises a second buffer memory (9) into which the demodulated input signal (SO) is diverted when the decoder is placed in the "replay" mode, the signal recorded in the second buffer memory (9) constituting the output signal when the decoder is switched from the "replay" mode to another so-called "return to live" mode of operation. In the "return to live" mode, the user views at high speed the video portion recorded in the second buffer memory before the decoder switches back to the "live" mode.

11 Claims, 2 Drawing Sheets

(56) References Cited

U.S. PATENT DOCUMENTS

| | | | |
|---|---|---|---|
| 5,724,091 A * | 3/1998 | Freeman et al. | 725/138 |
| 6,018,612 A * | 1/2000 | Thomason et al. | 386/82 |
| 6,233,389 B1 * | 5/2001 | Barton et al. | 386/46 |
| 6,240,244 B1 * | 5/2001 | Ikeda | 386/125 |
| 6,522,693 B1 * | 2/2003 | Lu et al. | 375/240.02 |
| 6,922,845 B2 * | 7/2005 | Yap et al. | 725/141 |
| 6,973,667 B2 * | 12/2005 | Fritsch | 725/88 |
| 6,993,787 B1 * | 1/2006 | Kamel et al. | 725/94 |
| 7,136,571 B1 * | 11/2006 | Dagtas | 386/68 |
| 2001/0014203 A1 | 8/2001 | Ito et al. | |
| 2006/0271979 A1 * | 11/2006 | Hejna | 725/89 |
| 2007/0009236 A1 * | 1/2007 | Kovacevic | 386/112 |

FOREIGN PATENT DOCUMENTS

| | | |
|---|---|---|
| EP | 1 143 732 Al | 10/2001 |
| JP | 08-18932 A | 1/1996 |
| JP | 08-84302 A | 3/1996 |
| JP | 10-215437 A | 8/1998 |
| JP | 2001-119669 A | 4/2001 |

* cited by examiner

DIGITAL DECODER HAVING A SO-CALLED "PLAYBACK" MODE OF OPERATION AND COMPRISING TWO BUFFER MEMORIES

BACKGROUND OF THE INVENTION

1. Field of the Invention

The invention relates to a digital decoder for television receiver, comprising an input for receiving a digital audio/video signal, means for demodulating and decoding the input signal into an output signal shaped for the television receiver, and a first buffer memory into which the input signal is diverted after demodulation when the decoder is placed in a so-called "live" mode of operation, the decoder having a so-called "replay" mode of operation in which the signal recorded in the first buffer memory constitutes the output signal from the decoder.

2. Background Art

Such a decoder can form an integral part of a television receiver. The audio/video digital input signal can arrive at the decoder via cable, via satellite or via hertzian signal. When the decoder is placed in the "live" mode, the demodulated input signal is recorded continuously in the first buffer memory. Stated otherwise, at each instant this first buffer memory retains a portion of the current programme received on a channel by the decoder. This buffer memory operates while recording as a FIFO stack or as a circular shift register. The switching of the decoder from the "live" mode to the "replay" mode allows the user to replay one or more times, on the screen of the television receiver, a past portion of the programme received by the decoder. On completion of replay, the user can switch the decoder into the "live" mode so as to resume the playing of the current programme received by the decoder. It is understood however that during the replay of the past programme portion which is recorded in the buffer memory, the user loses a part of the current programme which is received live on the decoder.

SUMMARY OF THE INVENTION

The aim of the invention is to remedy this drawback and for this purpose, the subject of the invention is a digital decoder for television receiver, characterized in that it furthermore comprises a second buffer memory into which the input signal is diverted after demodulation while the decoder is placed in the "replay" mode, the signal recorded in the second buffer memory being a temporally compressed version of the input signal and constituting the output signal when the decoder is switched from the "replay" mode to another so-called "return to live" mode of operation. By using two buffer memories, the user loses no portion of the programme even when he activates the "replay" mode of the decoder. Moreover, in the "replay" mode of the decoder, the user can use navigation buttons like fast or slow forward and rewind, image freeze etc. so as to play in various ways the programme portion recorded in the first buffer memory. When the user switches the decoder from the "replay" mode to the "return to live" mode, the second buffer memory is read-scanned as a FIFO stack. At the same time, the demodulated and temporally compressed input signal continues to be recorded in the second buffer memory at the bottom of the FIFO stack. The programme portion corresponding to the signal produced by the second buffer memory, in read mode, is presented on the screen in a fraction of its normal duration of presentation. As the presentation of the programme portion read from the second buffer memory is performed at a faster speed than the speed of its recording in the second buffer memory, there will be a moment onwards of which the signal produced by the second buffer memory and the input signal will coincide in time. At this instant, the decoder can be switched automatically from the "return to live" mode to the "live" mode.

According to particular features of the decoder according to the invention, in "replay" mode of the decoder, the first memory can be read scanned repetitively, or "loopwise", so that the user can replay several times, without intervention on the decoder, the programme portion recorded in the first buffer memory. The decoder comprises a filter placed upstream of the second buffer memory so as to temporally compress the demodulated input signal before it is recorded in the second buffer memory. This filter may be designed to eliminate the audio components of the demodulated input signal and to allow only the data in the demodulated input signal which are representative of full images to pass through to the said second buffer memory. The decoder can also comprise a filter placed upstream of the said first buffer memory so as to temporally compress the demodulated input signal before it is recorded in the first buffer memory. Each buffer memory operates as a FIFO stack or a circular shift register. The duration of recording in the second buffer memory can be increased by adjusting the rate of temporal compression. To improve the convenience of use of the decoder, the filling of the second buffer memory, by the demodulated and temporally compressed input signal, is monitored in the decoder and the decoder produces an alarm signal when the second buffer memory is full. Moreover, to optimize the use of the resources available in the decoder, an analysis module acts on the filter so as to parametrize the latter in such a way as to adapt the rate of compression of the signal recorded in the first or the second buffer memory to the resources available in the decoder.

BRIEF DESCRIPTION OF THE DRAWINGS

The decoder according to the invention and illustrated by the drawing now be described in greater detail.

DESCRIPTION OF THE PREFERRED EMBODIMENT

Figure 1:
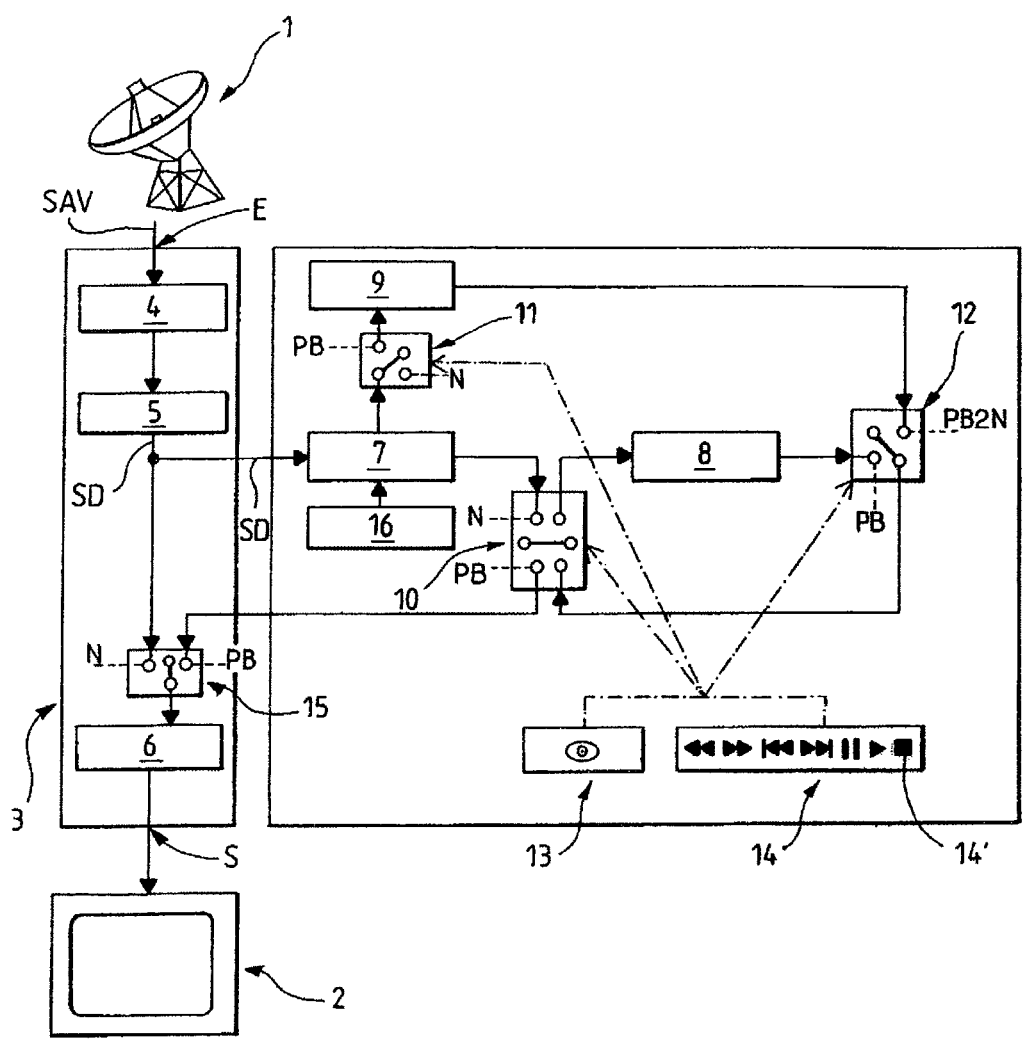
FIG. 1 represents very diagrammatically in the form of functional blocks, the architecture of the buffer memories of the decoder according to the invention.

FIG. 1, a parabolic antenna 1 is linked to a television receiver 2 by way of a decoder 3 according to the invention which comprises an input E for receiving an audio/video digital signal SAV and an output S intended to be connected to the television 2. The decoder 3 comprises a demodulator consisting of a tuner 4 fed with the input signal SAV and linked to a demultiplexer 5 which converts the signal SAV into a demodulated digital signal SD. This signal SD corresponds to the programme broadcast on a reception channel of the decoder selected by the user. The signal SD is sent after shaping to the output S of the decoder when the latter is placed in a so-called "live" mode of operation. More particularly, the signal SD which is for example an MPEG stream, is processed by an audio/video decompressor 6 which puts it into a form utilizable by the television 2, such as for example an RGB signal, before being sent to the output S of the decoder.

When the decoder 3 is placed in the "live" mode of operation, the signal SD which is transmitted to the decompressor 6 is also diverted at the output of the demultiplexer 5, through a filter 7, to the buffer memory 8. The buffer memory 8 operates in write mode as a FIFO stack or a circular shift register so as to permanently retain a certain current portion of the programme broadcast on the selected channel.

When the decoder 3 is placed in the "replay" mode, the output signal from the decoder consists of the signal recorded in the buffer memory 8. More particularly, the programme portion recorded in the memory 8 is sent to the input of the decompressor 6 so as to produce the output signal shaped for the television. The recording of the signal SD in the buffer memory 8 can be effected with or without temporal compression of the signal.

When the decoder is placed in the "replay" mode, the signal SD is diverted at the output of the demultiplexer 5, through the filter 7, to a second buffer memory 9 in which it is recorded after having undergone time compression. This second buffer memory 9 may also operate in write mode as a FIFO stack or a circular shift register so as to retain a certain current portion of the programme received on the selected channel of the decoder. The programme portion which is recorded in the buffer memory 9 represents a fraction of the normal programme portion so that the reading from the buffer memory 9 of this programme portion will be faster than the writing of this same programme portion to the memory 9.

The decoder is designed to switch on command from the user from the "replay" mode to a so-called "return to live" temporary mode of operation according to which the content of the buffer memory 9 constitutes the output signal from the decoder. In the "return to live" mode, the user plays the programme portion recorded in the buffer memory 9 at the same time as the demodulated and temporally compressed signal SD continues to be recorded in the memory 9. As the playback of the programme portion recorded in the memory 9 is performed at a faster speed than the recording of this programme portion in the memory 9, at a moment the buffer memory 9 will have been completely read-scanned. At this instant, the signal which is produced at the output of the memory 9 coincides with the signal SD and the decoder 3 is switched automatically into the "live" mode.

The elements allowing the switching of the decoder 3 into the "live", "replay" and "return to live" modes are represented in FIG. 1 by switches 10, 11, 12 with two positions but it is obvious that these switches may in fact be routines of a programmable processor.

More particularly, the first switch 10 which is upstream of the first buffer memory 8 can be in a state denoted N corresponding to the "live" mode in which it links the output of the demultiplexer 5, through the filter 7, to the input of the first buffer memory 8. This switch 10 can also be placed in a state indicated by the reference PB in FIG. 1 corresponding to the "replay" mode in which it links the output of the first buffer memory 8 to the input of the decompressor 6.

The second switch 11 which is upstream of the second buffer memory 9 can be placed in a state indicated by the reference N corresponding to the "live" mode in which the input of the second buffer memory 9 is disconnected from the output of the multiplexer 5. It may also be placed in a state indicated by the reference PB corresponding to the "replay" mode in which it links the output of the demultiplexer 5 to the input of the second buffer memory 9.

The third switch 12 which is situated downstream of the two buffer memories 8 and 9 can be placed in a state indicated by the reference PB corresponding to the "replay" mode in which it links the output of the first buffer memory 8 to the decompressor 6 through the switch 10 when the latter is in the PB state. It may also be placed in a state indicated by the reference PB2N corresponding to the "return to live" mode in which it links the output of the second buffer memory 9 to the decompressor 6 through the switch 10 when the latter is in the PB state. A fourth switch 15 directs towards the decompressor 6 either the signal at the output of the demultiplexer 5 (in the state N), or the signal at the output of the switch 10 (in the state PB).

A control button 13 of the decoder is represented in FIG. 1. The actuation of this button 13 by the user switches the decoder from the "live" mode to the "replay" mode and vice versa depending on the current mode of operation of the decoder. Moreover, control buttons 14 of the decoder are also represented in FIG. 1. These control buttons 14 include navigation buttons—such as buttons like fast or slow forward and rewind, image freeze, etc. as well as a button 14'—stop—which, when it is actuated by the user, switches the decoder from the "replay" mode to the "return to live" mode. As represented in FIG. 1 by arrows, the actuation of the buttons 13 and 14' acts on the switches 10, 11 and 12.

Figure 2:
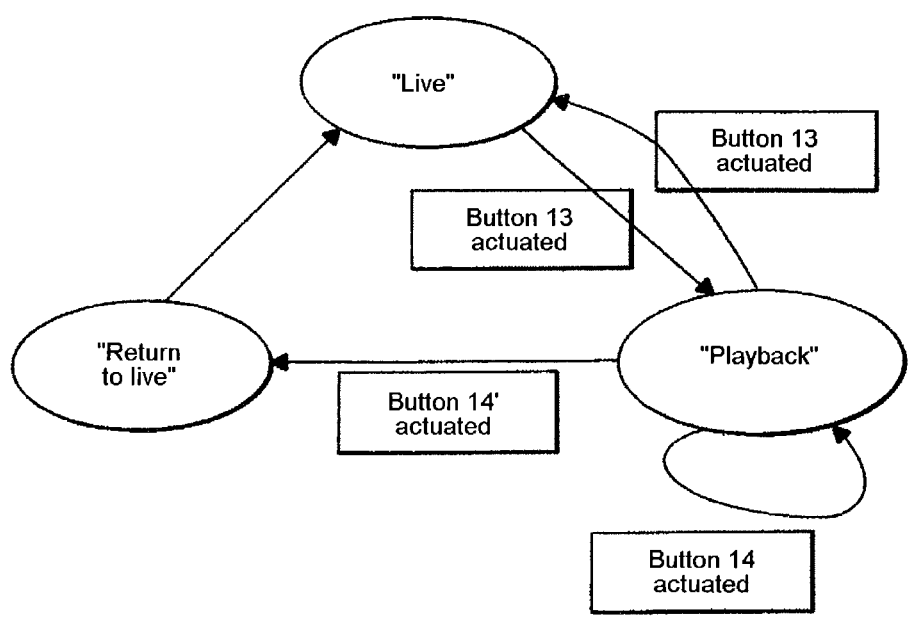
FIG. 2 is a flowchart illustrating the operation of the decoder according to the invention.

As illustrated in FIG. 2, starting from the "live" mode of operation of the decoder, the user actuates the button 13 thereby placing the switch in the "replay" mode. The programme portion recorded in the memory 8 is presented on the screen of the television, possibly repetitively. In this mode of operation of the decoder 3, the user can actuate the navigation buttons 14 indicated above to obtain various presentations on the screen of the programme portion. From the "replay" mode, the user can again actuate the control button 13 to switch the decoder into the "live" mode, the consequence of this being the loss of a part of the broadcast programme, or actuate the control button 14' to switch the decoder into the "return to live" mode. In the "return to live" mode, the programme portion contained in the memory 9 is viewed at high speed on the screen by the user and on completion of this viewing, the decoder switches automatically into the "live" mode. Upon switching from the "return to live" mode to the "live" mode, the content of the memories 8 and 9 is automatically erased.

The two memories 8 and 9 may be different units with different recording capacities. It may also be a question of a partitioned file.

The time compression of the signal SD in particular for its recording in the memory 9 can consist firstly in discarding the audio component of the signal SD, this being achievable through the filter 7. The filter 7 can be designed to allow through only the data representative of full images (such as "intra" images in the MPEG-2 standard). As is known from the state of the art, in an MPEG stream around one image out of twelve is found to be encoded in full, that is to say independently of the images preceding it and following it. When a programme portion consisting solely of full images is played, the programme portion runs fast, that is to say the programme is played at a speed 12 times greater than the normal playing speed of the same programme when the decoder is in the "live" mode.

The signal recorded in the memory 8 may also be temporally compressed in the same way as the signal recorded in the memory 9.

The block 16 represents a module for analysing the resources 15 available in the decoder, which is designed to automatically parametrize the filter 7 in such a way as to adjust the rate of compression with a view to optimizing the occupancy of the buffer memories 8 and 9.

Moreover, the filling of the memory 9 may be monitored in the decoder so as to allow the latter to produce an alarm signal for the user when the memory 9 is full. This alarm signal may for example take the form of a message displayed on the screen of the television.

The invention claimed is:

1. Digital decoder for television receiver, comprising an input for receiving a digital audio/video signal, a means for demodulating and decoding an input audio/video signal into an output signal for the television receiver, and a first buffer memory into which the input signal is diverted after demodulation when the decoder is placed in a "live" mode of operation, the decoder having a replay mode of operation in which the signal recorded in the first buffer memory constitutes the output signal from the decoder, said decoder further comprises a second buffer memory into which the input signal is diverted after demodulation while the decoder is placed in the replay mode, and the signal recorded in the second buffer memory being processed to eliminate selected components of the demodulated input signal so as to provide a temporally compressed version of the input signal and constituting the output signal when the decoder is switched from the replay mode to a "return to live" mode of operation.

2. Decoder according to claim 1, in which in replay mode, the first buffer memory is read-scanned repetitively.

3. Decoder according to claim 1, comprising a filter placed upstream of said second buffer memory so as to temporally compress the demodulated input signal before it is recorded in this second buffer memory.

4. Decoder according to claim 3, in which the filter is designed to eliminate the audio components of the demodulated input signal before it is recorded in said second buffer memory.

5. Decoder according to claim 3, in which the filter is designed to allow only the data in the demodulated input signal which are representative of full images to pass through to said second buffer memory.

6. Decoder according to claim 1, in which each buffer memory operates as a FIFO stack or a circular shift register.

7. Decoder according to claim 1, in which the decoder is designed to switch automatically from the "return to live" mode to the "live" mode with erasure of the content of the two buffer memories as soon as the content of said second buffer memory has been completely read-scanned.

8. Decoder according to claim 1, in which the filling of said second buffer memory is monitored in the decoder and in which an alarm signal is produced by the decoder when said second buffer memory is full.

9. Decoder according to claim 1, comprising a filter placed upstream of said first buffer memory so as to temporally compress the demodulated input signal before it is recorded in this first buffer memory.

10. Decoder according to claim 9, in which an analysis module acts on the filter so as to parameterize the latter in such a way as to adapt the rate of compression to the resources available in the decoder.

11. Decoder according to claim 3, in which an analysis module acts on the filter so as to parameterize the latter in such a way as to adapt the rate of compression to the resources available in the decoder.

* * * * *